Dec. 19, 1933.  W. NOBLE  1,940,461
OVEN
Filed June 28, 1930   2 Sheets-Sheet 1
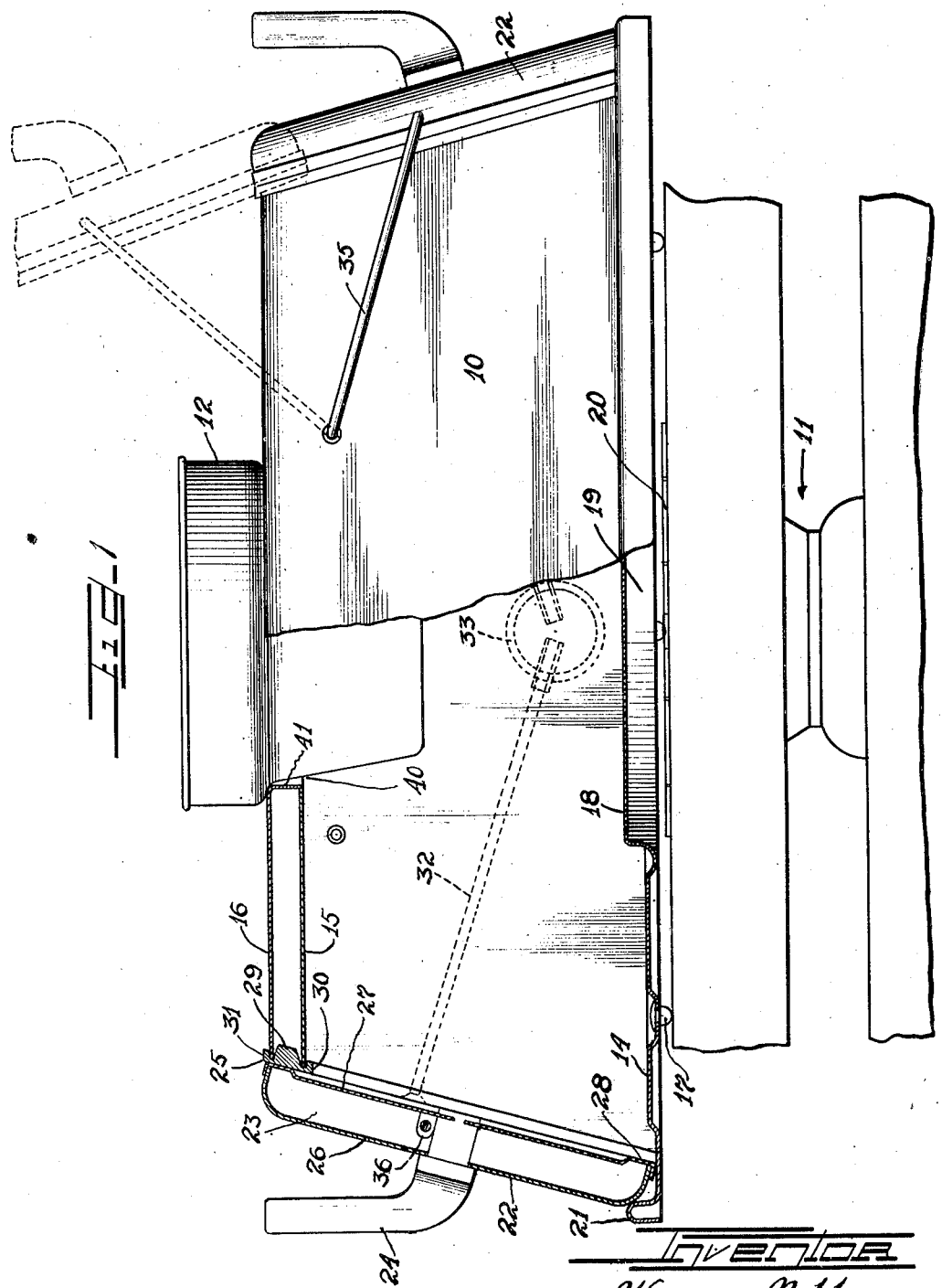
Inventor
Warren Noble
by Charles M. Mills Attys

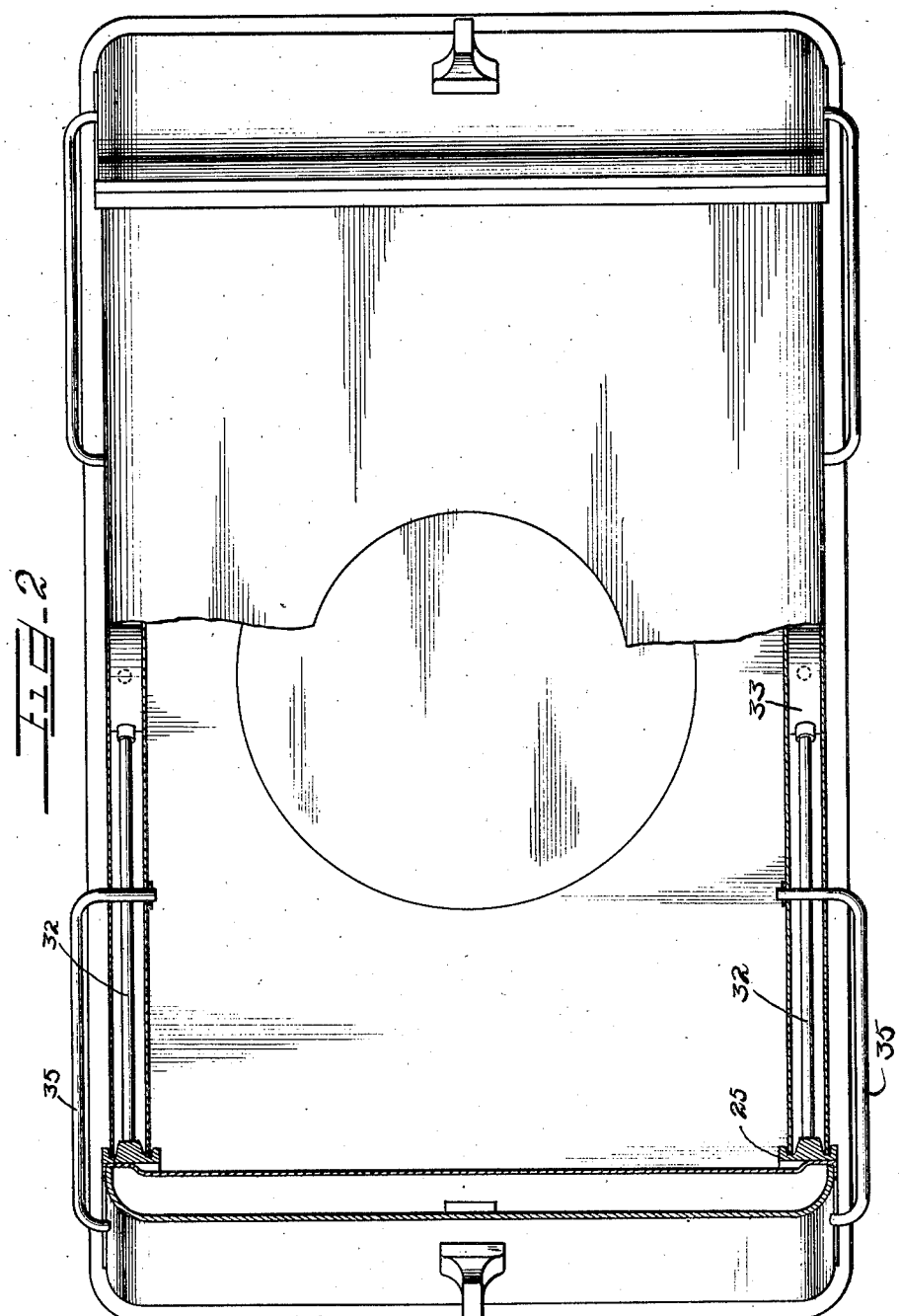

Patented Dec. 19, 1933

1,940,461

UNITED STATES PATENT OFFICE 1,940,461

OVEN

Warren Noble, Detroit, Mich., assignor to Electromaster, Inc., Detroit, Mich., a corporation of Michigan Application June 28, 1930. Serial No. 464,694

3 Claims. (Cl. 126—275)

This invention relates to cooking apparatus and more particularly to an oven of the hot-plate type adapted to be heated by being placed on a suitable heating device.

An object of this invention is to provide an improved hot-plate type of oven of simple and inexpensive construction and in which the door thereof when in an open position will be supported in such a way as not to add to the amount of area of the heating device required to accommodate and support the oven.

Another object of the invention is to provide an oven with a closure connected to the oven in such a manner that it may be swung entirely clear of an end opening in the oven and onto the top of the oven.

A further object of the invention resides in the provision of an improved oven construction having hollow walls for providing a blanket of insulating air about the oven and including a hot-plate at the bottom of the oven for, cooperating with a suitable heating device, such for example, as a burner.

Another and further object of the invention resides in the provision of a hot-plate type of oven including hollow walls and being provided at its top with an opening for receiving a cooking vessel.

In accordance with the general features of this invention there is provided an oven of the hot-plate type having a side-wall with an opening affording access to the interior of the oven and adapted to be covered by a closure or door connected to the oven in such a manner that it may be swung or moved entirely clear of the opening and into a position adjacent another side of the oven, such for example, as the top of the oven whereby it may be then supported by the top of the oven and in that way not add to the amount of area of the heating device required to support and accommodate the oven.

Another feature of the invention relates to the provision of novel mechanism for swingably connecting a closure or door to an oven.

A still further feature of the invention relates to the provision of a hot-plate type of oven having a plate at its bottom adapted to be exposed directly to heat and including hollow walls above the bottom formed in such a way as to define a blanket of insulating air about the oven.

A further feature of the invention relates to the provision of a hot-plate type of oven including heat-insulated walls and having its interior surface chromium plated so as to augment the heat reflexing qualities of the walls of the oven.

Another and further feature of the invention relates to the provision of a novel hot-plate type of oven having its top formed in such a manner as to define a pocket for receiving a cooking vessel adapted to be exposed to the hot gases within the oven.

Another feature of the invention resides in the provision of novel means for defining the seat for the door of an oven whereby the door may be held perfectly flush with the open end of the oven.

Other objects and features of this invention will more fully appear from the following detail description taken in connection with the accompanying drawings which illustrate a single embodiment thereof, and in which Figure 1 is a side view of my novel oven partly in section and illustrating it as resting on a suitable cooking appliance and also showing a cooking vessel mounted in the opening in the top of the oven; and Figure 2 is a plan view partly in section of the oven shown in Figure 1.

The reference character 10 designates generally the hot-plate oven of my invention which is adapted to be placed on a suitable heating appliance, such for example, as the electrical burner designated generally by the reference character 11. Also, as shall be more fully explained hereinafter, the oven has its top formed to receive a cooking vessel designated by the reference character 12.

The oven 10 includes a sheet metal bottom 14 and hollow top and side-walls defined by spaced sheets of metal 15 and 16. The metal sheets 15 and 16 are bent into a U-shape so as to form the vertical sides and the top of the oven. I purposely space these sheets from each other so as to provide an insulating blanket of air about the oven. Furthermore, as I shall more fully point out hereinafter, the doors are also formed hollow for the purpose of providing blankets of air at the ends of the oven. The bottom 14 is necessarily made of only a single sheet of metal, or in other words is not of a hollow construction so that the heat from the appliance 11 may be readily conveyed or transmitted to the interior of the oven.

From Figure 1 it will be observed that the bottom 14 is provided with a plurality of projections 17 comprising four legs for supporting the oven on top of the appliance 11. Also, the central portion of the bottom 14 has a central depression extending into the interior of the oven and designated by the reference character 18. This depression 18 defines a circular heat pocket 19 adapted to be positioned directly over the grid 20 of the heating appliance or burner 11. Although the heating appliance 11 is illustrated as being of the electrical burner type still it will, of course, be appreciated that my oven is not limited in use to electrical cooking apparatus but may be used with equal advantage on other types of heating apparatus.

The peripheral edges of the bottom 14 are bent upwardly into a U-shaped sheet 21 which completely surrounds the oven and also defines at the ends of the oven as shown in Figure 1 an abutment for the lower edges of the doors 22—22. Now it is, of course, to be appreciated that while I have illustrated an oven with both ends formed open and provided with doors 22—22, the invention is not to be thus limited for, obviously the oven may be made with only a single door if it is so desired. Moreover, inasmuch as the ends of the oven are identical in construction it is thought that a description of one end will suffice for both ends.

Each of the doors or closure members 22 is formed hollow as indicated at 23 so as to enable the ends of the oven 10 to be covered by blankets of air. Also fastened to each door is a handle member 24 by means of which the door may be actuated from closed position to open position and vice versa. Furthermore, it will be observed from Figure 1 that when the door is in its closed position it has its peripheral portions in contact with or seated on a plate 25.

Each of the doors 22 comprises an outer curved plate 26 and an inner plate 27 having its peripheral edge bent upwardly onto the peripheral edge of the plate 26 so as to form the airtight space 23. The plate 27 has an annular ridge 28 formed in its periphery for engagement with the previously mentioned plate 25.

The plate 25 has a cross-section of such a shape that it includes a central projection 29 adapted to extend into the air space between the plates 15 and 16 defining the walls of the oven for the purpose of closing this space, and also includes spaced ridges 30 and 31 for engaging over the outer surfaces of the two plates 15 and 16 as is readily evident from Figure 1. This plate 25 is held in place by means of a pair of spaced rods 32—32 secured to the lateral portions of the plate 25 and each having its innermost end fastened to a ring member 33 positioned between the spaced plates 15 and 16 and suitably anchored thereto. Referring to Figure 2 it will be observed that the two rods 32 extend inwardly from the plate 25 in the air space between the two metal plates 15 and 16 defining the walls of the oven 10.

Each door 22 is pivotally connected to the oven 10 by means of a pair of spaced links 35—35. Each of these links has its ends bent inwardly toward the oven 10. One of the ends of each link 35 extends into the interior of the associated door 22 and is pivotally connected to a bracket 36 in the air space 23 of the door. The other end of each link extends into an opening in the adjacent wall of the oven and is pivotally supported in the plates 15 and 16 defining the oven walls. These links are of sufficient length to permit of the door being swung bodily and upwardly away from the end opening in the oven whereby the door may be disposed on the top of the oven. In Figure 1 I have illustrated by the dotted lines how the door may be swung to its uppermost position.

Also, it is to be noted as previously pointed out, the top of the oven is provided with an opening for receiving a cooking vessel 12. This opening is designated by the reference character 40 and is partly defined by an annular downwardly turned flange 41 formed integral with the outer oven plate 16.

All of the interior surfaces of the oven 10, including that of the walls and of the doors 22—22 may be chromium plated so as to augment the heat radiating qualities of the walls of the oven.

The operation of the doors of the oven of my invention is thought to be obvious from the foregoing description and it will be readily appreciated that the construction disclosed is highly advantageous in that it permits of a door of the oven being moved to its open position in such a way as not to increase the amount of area of the heating device 11 required to accommodate the oven. Obviously, in the case of ovens having a door which must be moved laterally from the opening which the door is designed to close the door necessarily will require a greater amount of horizontal space and hence increase the amount of area of the heating surface of the device required to accommodate the oven. On the other hand, if the oven is disposed on a heating device which is smaller than the bottom of the oven then if the door is allowed to project laterally from an end of the oven it necessarily follows that the oven will require a greater amount of horizontal room in order to allow the door to be opened and closed freely and without any interference.

In my construction the door may be readily swung to a position over the top of the oven where it does not add to the horizontal space required to accommodate the oven. Moreover, the top of the oven may be utilized to support the door when the door is in its open position. Furthermore, the support of the door is of such a nature as to permit of ready movement from open to closed position and vice versa with a minimum amount of effort.

I also wish to point out the fact that the slanting links 35 connected to the door are disposed in such a manner as to cause the door to be drawn tightly against the corresponding end of the oven when the door is in its lowermost or closed position, which insures a tight engagement of the end of the oven by the door 22.

Now I desire it understood that although I have illustrated and described in detail the preferred embodiment of this invention, the invention is not to be thus limited but only in so far as defined by the scope and spirit of the appended claims.

I claim as my invention:

1. An oven construction comprising a bottom adapted to be set on a cooking appliance, spaced wall members defining a hollow top and sides secured to said bottom, end members to close the space between the wall members at their ends and maintain the wall members in spaced relationship, each of said end members being adapted to form a seat for an oven closure, and anchor means for said end members disposed in the space between the wall members.

2. An oven construction comprising a bottom adapted to be set on a cooking appliance, spaced wall members defining a hollow top and sides secured to said bottom, an end member to close the space between the wall members at one end of the oven and maintain the wall members in spaced relationship, said end member defining a seat for an oven closure, and anchor means for said end member concealed by the wall members.

3. An oven construction comprising a bottom adapted to be set on a cooking appliance, spaced wall members defining a hollow top and sides secured to said bottom, end members to close the space between the wall members at their ends and maintain the wall members in spaced relationship, each of said end members being adapted to form a seat for an oven closure, and means interconnecting the end members having parts disposed in the space between the wall members and operable in such a manner as to draw the end members tightly against the ends of the wall members.

WARREN NOBLE.